US012595132B2

(12) United States Patent
    Suliman

(10) Patent No.: US 12,595,132 B2
(45) Date of Patent: Apr. 7, 2026

(54) END BELL FOR BELT CONVEYOR IDLER ASSEMBLY

(71) Applicant: Nordstrong Equipment Limited, Winnipeg (CA)

(72) Inventor: Mohanad Suliman, Winnipeg (CA)

(73) Assignee: NORDSTRONG EQUIPMENT LIMITED, Winnipeg (CA)

( * ) Notice: Subject to any disclaimer, the term of this patent is extended or adjusted under 35 U.S.C. 154(b) by 105 days.

(21) Appl. No.: 18/792,669

(22) Filed: Aug. 2, 2024

(65) Prior Publication Data
    US 2026/0035183 A1     Feb. 5, 2026

(51) Int. Cl.
    B65G 39/09     (2006.01)
    B65G 39/12     (2006.01)
(52) U.S. Cl.
    CPC ............. B65G 39/09 (2013.01); B65G 39/12 (2013.01)
(58) Field of Classification Search
    CPC ................................ B65G 39/09; B65G 39/12
    USPC ........................................................ 193/37
    See application file for complete search history.

(56) References Cited

U.S. PATENT DOCUMENTS

| | | | | |
|---|---|---|---|---|
| 2,702,868 A | * | 2/1955 | Kindig ................... | B65G 39/09 |
| | | | | 384/519 |
| 3,734,579 A | * | 5/1973 | Schumacher ......... | F16C 33/723 |
| | | | | 301/108.3 |
| 5,645,155 A | * | 7/1997 | Houghton .............. | B65G 39/12 |
| | | | | 193/35 R |
| 5,857,554 A | * | 1/1999 | Toye ...................... | B65G 39/09 |
| | | | | 193/35 R |
| 6,702,091 B2 | * | 3/2004 | Nimmo .................. | B65G 39/12 |
| | | | | 193/35 R |
| 9,837,870 B2 | * | 12/2017 | Greve ....................... | H02K 5/16 |
| 2005/0000782 A1 | * | 1/2005 | McDaniel .............. | B65G 39/02 |
| | | | | 198/842 |
| 2009/0000903 A1 | * | 1/2009 | Yazaki ................... | B65G 39/12 |
| | | | | 193/35 R |
| 2021/0172479 A1 | * | 6/2021 | Broomfield ............ | H02K 15/14 |

FOREIGN PATENT DOCUMENTS

| | | | | | |
|---|---|---|---|---|---|
| CN | 108190411 A | * | 6/2018 | ............. | B65G 39/09 |
| KR | 102418285 B1 | * | 7/2022 | ........... | B65G 49/064 |

* cited by examiner

*Primary Examiner* — James R Bidwell
(74) *Attorney, Agent, or Firm* — Cast Legal Studio PLLC

(57)     ABSTRACT
An end bell includes a housing. The housing includes a bearing seat for a bearing positioned within an inner portion of the housing and includes a grounding groove for a grounding wire positioned along an outer portion of the housing. A method for attaching an end bell to a belt conveyor idler includes inserting a grounding wire into a grounding groove of the end bell, inserting a bearing into the bearing seat, and inserting the end bell into a belt conveyor idler assembly via press fit. The end bell is made of nonconductive material.

20 Claims, 6 Drawing Sheets

400

END BELL FOR BELT CONVEYOR IDLER ASSEMBLY

BACKGROUND

End bells for belt conveyor idlers are typically made of steel. Machining and welding are required to attach a steel end bell to the tube roller of the belt conveyor idler assembly, which can add time and cost to the belt conveyor idler manufacturing process. End bells for belt conveyor idlers also have a service life that could be extended if the end bells were made of a material more durable than steel. In some cases, end bells have been made of other nonconductive materials. However, these materials pose a risk of static electricity buildup, static discharge, and subsequent explosion of the matter being carried on the belts themselves. Accordingly, there is a need for a cheaper and longer lasting end bell that is still safe.

BRIEF SUMMARY

An end bell includes a housing. The housing includes a bearing seat for a bearing positioned within an inner portion of the housing and includes a grounding groove for a grounding wire positioned along an outer portion of the housing.

A method for attaching an end bell to a belt conveyor idler includes inserting a grounding wire into a grounding groove of the end bell, inserting a bearing into the bearing seat, and inserting the end bell into a belt conveyor idler assembly via press fit.

This Summary is provided to introduce a selection of concepts in a simplified form that are further described below in the Detailed Description. This Summary is not intended to identify key features or essential features of the claimed subject matter, nor is it intended to be used to limit the scope of the claimed subject matter.

DETAILED DESCRIPTION

An end bell is provided that is made of a nonconductive material and allows the end bell to be attached to the tube roller of the belt conveyor idler via press fit, a cheaper method than machining and welding. The nonconductive material described herein is also more durable and lasts longer than a conventional steel end bell. Additionally, the end bell includes a path to allow the tube roller to be grounded to the bearing, thus eliminating the risk of static electricity buildup, static discharge, and subsequent explosion posed by using a nonconductive material to construct the end bell without any grounding mechanism.

Figure 1:
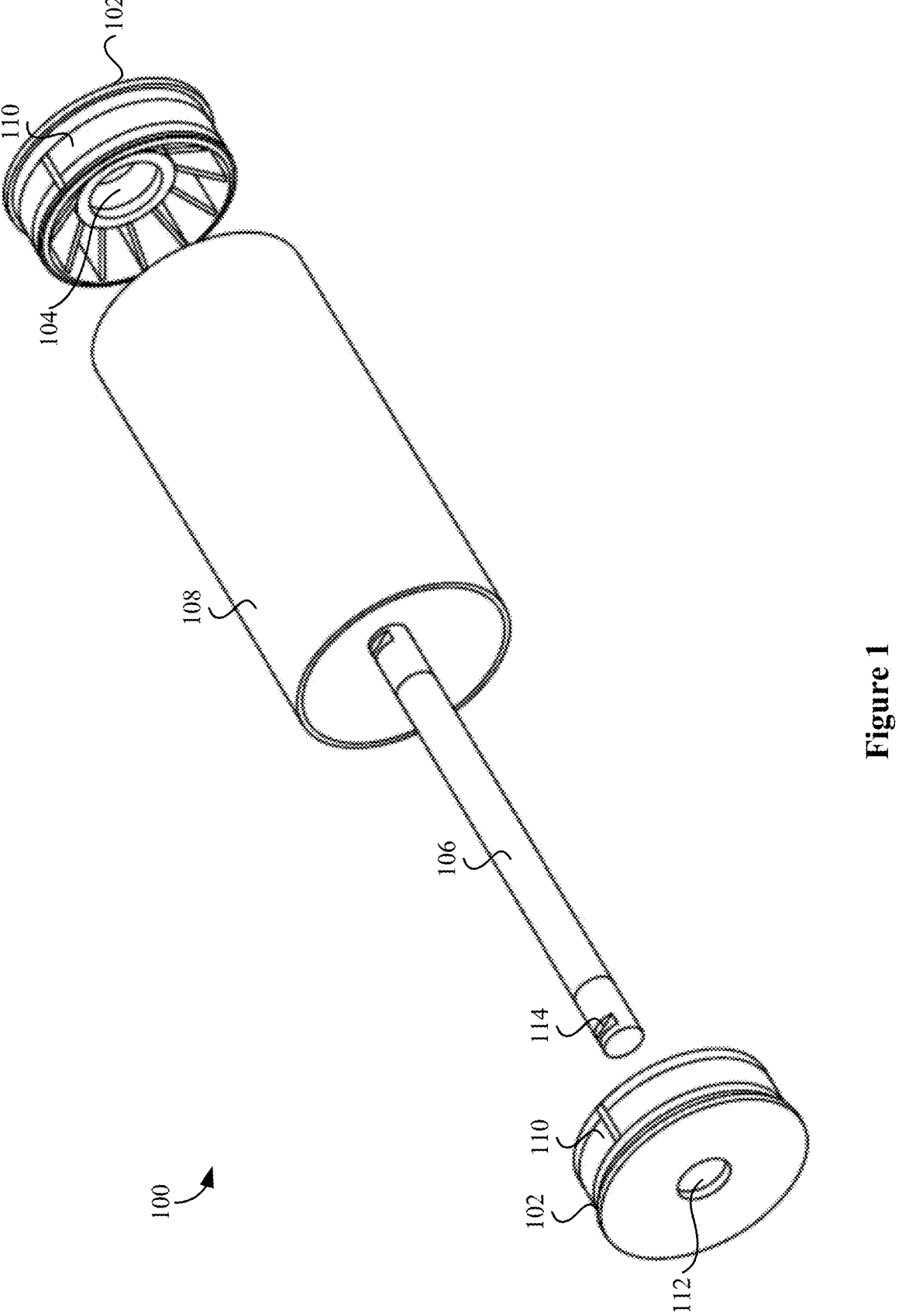
FIG. 1 illustrates an exploded view of a belt conveyor idler assembly.
Figure 2A:
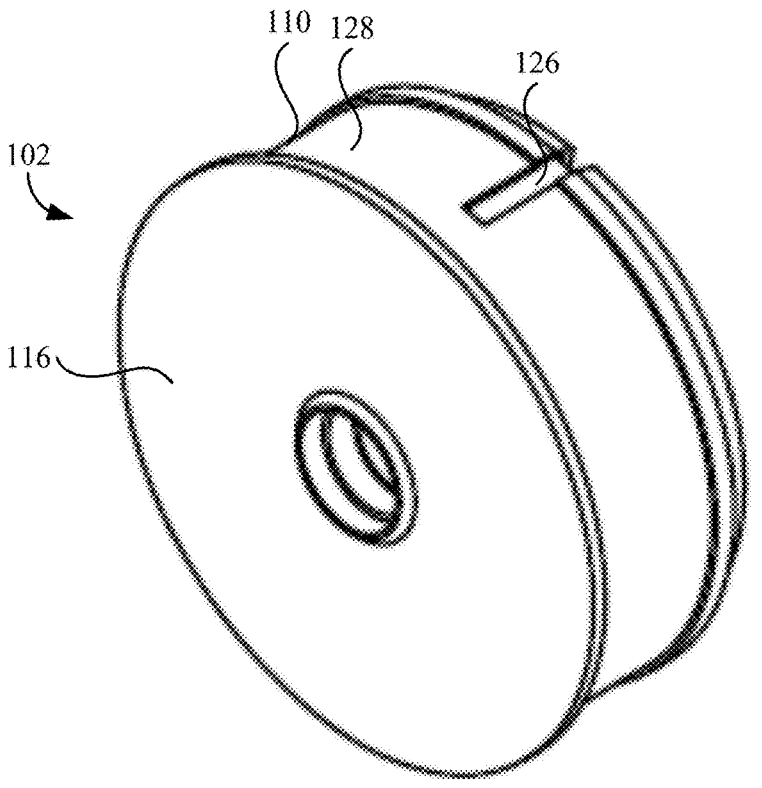
FIGS. 2A-E illustrate views of an end bell.
Figure 2B:
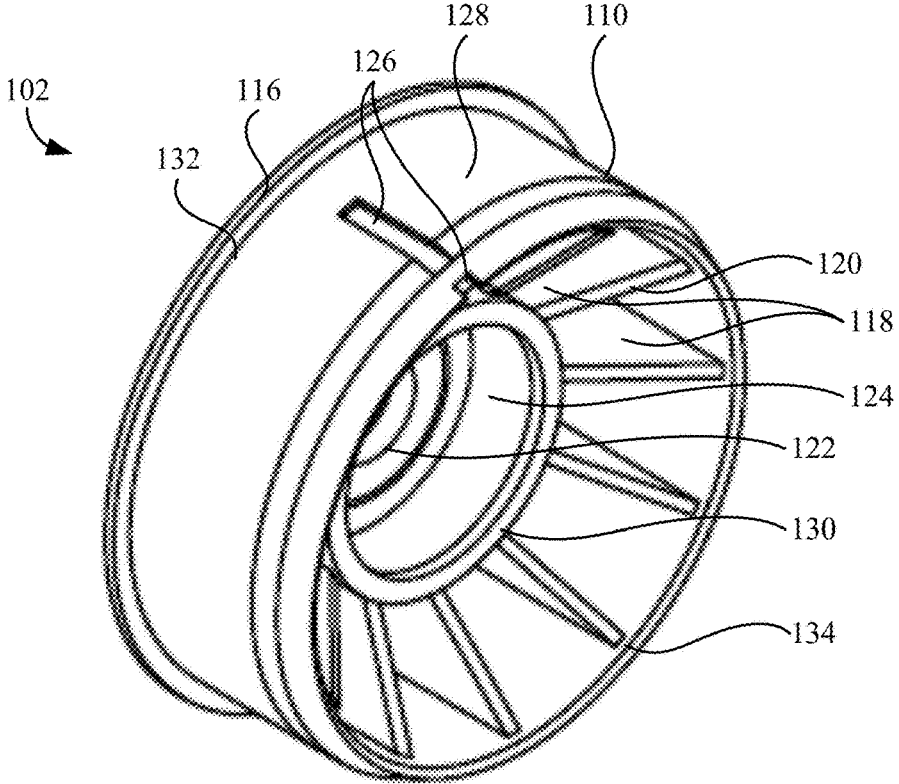
Figure 2C:
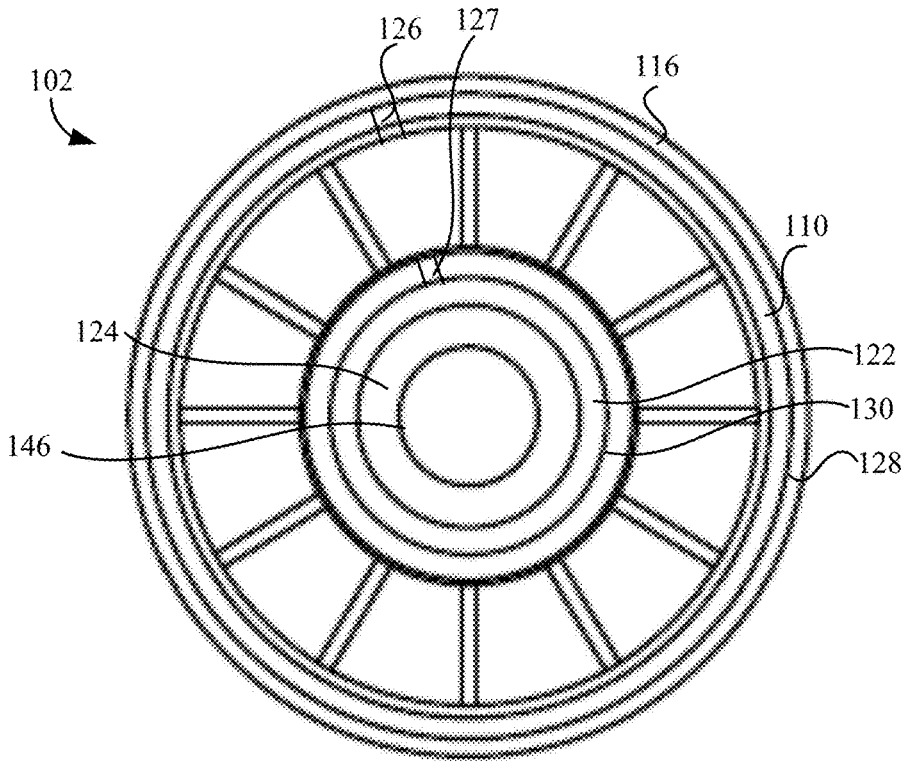
Figure 2D:
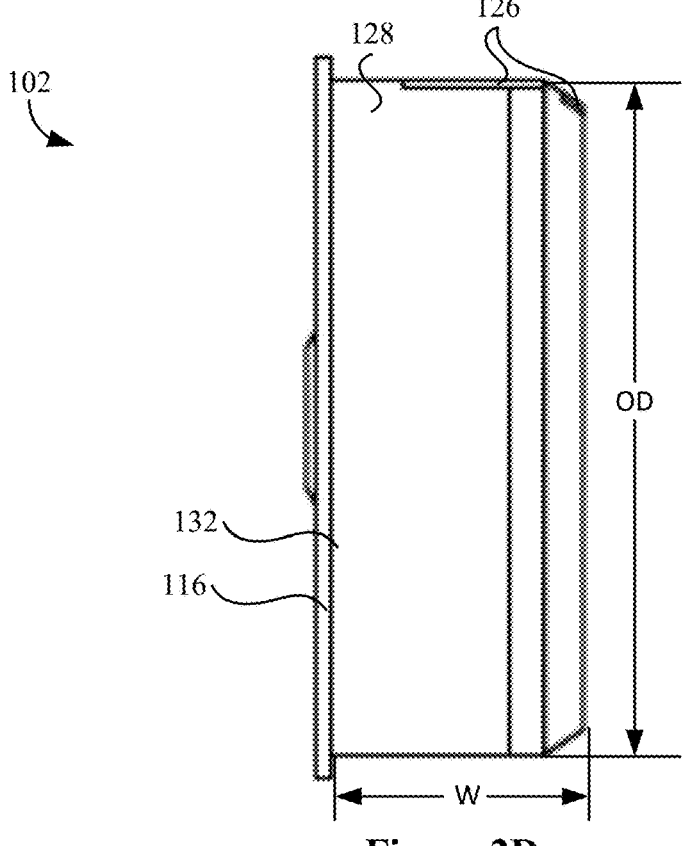
Figure 2E:
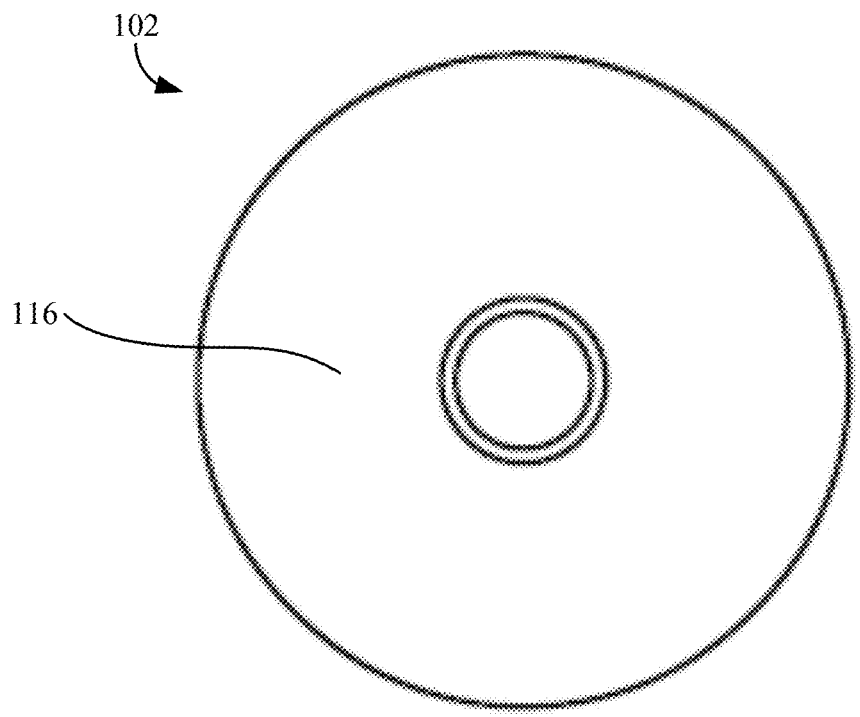

FIG. 1 illustrates an exploded view of a belt conveyor idler assembly. Referring to FIG. 1, a belt conveyor idler assembly 100 includes an end bell 102 and a corresponding bearing 104 at each end of the belt conveyor idler assembly 100, a shaft 106, and a tube roller 108. When the belt conveyor idler assembly 100 is in use, the shaft 106 and the tube roller 108 spin to move a belt (not illustrated) carrying matter, such as material from mining, agricultural product, etc.

The end bell 102 is used to cap the ends of the tube roller 108, keep the shaft 106 in place, allow the tube roller 108 to spin, house the corresponding bearing 104, and protect the corresponding bearing 104 from degradation by the surrounding environment. The end bell 102 includes a housing 110 that houses the corresponding bearing 104. The end bell 102 may further include a shaft aperture 112 for the shaft 106 positioned at, proximal to, or near the center of the housing 110. The shaft aperture 112 allows the end bell 102 to fit around the shaft 106 and keeps the shaft 106 in place. Furthermore, at the ends of each shaft 106, a connection mechanism 114 allows the belt conveyor idler assembly 100 to be connected to structure supporting a plurality of belt conveyor idler assemblies, belt, and the materials that are carried over the belt system. In some cases, the tube roller 108 is made of steel or some other conductive material. In some cases, the housing 110 is cylindrical or substantially cylindrical.

FIGS. 2A-E illustrate views of the end bell. Referring to FIGS. 2A-2E, the end bell 102 includes the housing 110. The housing 110 includes a bearing seat 122 for a bearing, such as corresponding bearing 104 of FIG. 1, positioned within an inner portion 124 of the housing 110 and a grounding groove 126 for a grounding wire (illustrated in FIG. 3A) positioned along or substantially along an outer portion 128 of the housing 110.

At least a portion or all of the end bell 102 is made of nonconductive material. The nonconductive material can be made of nylon, high-density polyethylene, polyethylene terephthalate, fiber-reinforced plastic, glass-fiber-reinforced plastic, carbon-fiber-reinforced plastic, glass-fiber-reinforced nylon, any combination thereof or any other suitable nonconductive material. For example, a suitable nonconductive material can be made of a prime feedstock resin and reinforced with glass fiber. A suitable nonconductive material can have one or more properties such as a specific gravity that is 1.38, a tensile strength of 27,000 psi at 73° F., 2-4% tensile elongation at 73° F., a flexural modulus of 1,500,000 at 73° F., a notched izod impact of 2.1 ft-lb/in at 73° F., and a deflection temperature under load (264 psi, unannealed) of 482-509° F. Nonconductive materials that exhibit similar properties are also suitable as a material for the end bell 102. The specific properties of the material of the end bell 102 can vary based on the application in which the end bell 102 is going to be used.

In some cases, the outer portion 128 of the housing 110 has an outside diameter (OD) of 4.0 inches to 7.0 inches. In some cases, the outer portion 128 of the housing 110 has an outside diameter (OD) of 4.73 inches. The outside diameter (OD) of the outer portion 128 of the housing 110 should be sized to fit within and/or couple to a tube roller, such as tube roller 108 of FIG. 1, of a belt conveyor idler assembly 100. In some cases, a width (W) of the outer portion 128 of the housing 110 is 1.5 inches to 4 inches. In some cases, a width (W) of the outer portion 128 of the housing 110 is 1.93 inches.

In some cases, the end bell 102 further includes a circular endpiece 116 attached to an outer end 132 of the housing 110. The circular endpiece 116 may have a larger diameter than the outside diameter (OD) of the outer portion 128 of the housing 110 to prevent the end bell 102 from moving and/or sliding deeper into the tube roller of the belt conveyor idler assembly and/or to position the end bell 102 at the correct position within the tube roller and along the shaft of the belt conveyor idler assembly. In some cases, the circular endpiece 116 is also made of nonconductive material(s). In some cases, the circular endpiece 116 is formed, for example during manufacturing, as a single piece with the housing 110 such that the end bell 102 is monolithic. For example, the end bell 102 and the circular endpiece 116 can be created as a single piece using injection molding during the manufacturing process. In some cases, the circular endpiece 116 is a separate piece that is attached by suitable attachment means, such as adhesive, to the housing 110. The circular endpiece 116 can also include a shaft aperture to allow the shaft of the belt conveyor idler assembly to pass through the end bell 102. The circular endpiece 116 substantially or completely prevents unwanted intrusion of materials and/or liquids that may otherwise degrade the belt conveyor idler components.

In some cases, the width (W) of the outer portion 128 of the housing 110 is greater than a width of the bearing seat 122 of the housing 110. In some cases, the end bell 102 further includes gussets 118 connecting the outer surface 130 of the bearing seat 122 to an inner surface 134 of the outer portion 128 of the housing 110. In some cases, the gussets 118 are evenly spaced around the bearing seat 122. In some cases, the gussets 118 include a gusset edge 120 that runs from the inner surface 134 of the outer portion 128 of the housing 110 to the outer surface 130 of the bearing seat 122 of the housing 110. In some cases, the gussets 118 are formed, for example during manufacturing, as a single piece with the housing 110 such that the end bell 102 is monolithic. In some cases, the gussets 118 are separate pieces that are attached by suitable attachment means, such as an adhesive, to the housing 110. In some cases, the gussets 118 are also made of nonconductive material(s). The gussets 118 provide structural support between the bearing seat 122 and the outer portion 128 of the housing 110. In some cases, a solid material instead of gussets 118 can be used to provide structural support between the bearing seat 122 and the outer portion 128 of the housing 110. However, gussets 118 use less material than a continuous, solid material.

In some cases, the bearing seat 122 includes an inner face 146 for receiving the bearing. When used in the belt conveyor idler assembly, the inner face 146 is proximal to the tube roller. Therefore, when the end bell 102 is inserted into a tube roller of a belt conveyor idler assembly, the internal components, such as a bearing, are protected from degradation by the external environment. In some cases, the bearing seat 122 is configured to receive a ball bearing, such as a 2RS or ZZ ball bearing.

In some cases, the grounding groove 126 for the grounding wire further includes an inner grounding groove 127 positioned along or substantially along the inner portion 124 of the housing 110 and/or the outer surface 130 of the bearing seat 122 so that the grounding wire can be connected to the bearing of the belt conveyor idler assembly. In some cases, the grounding groove 126 is configured to receive a braided conductive wire. In some cases, the braided conductive wire is 14-gauge in size. The conductive wire may be made of copper, aluminum, or any other suitable conductive material.

Figure 3A:
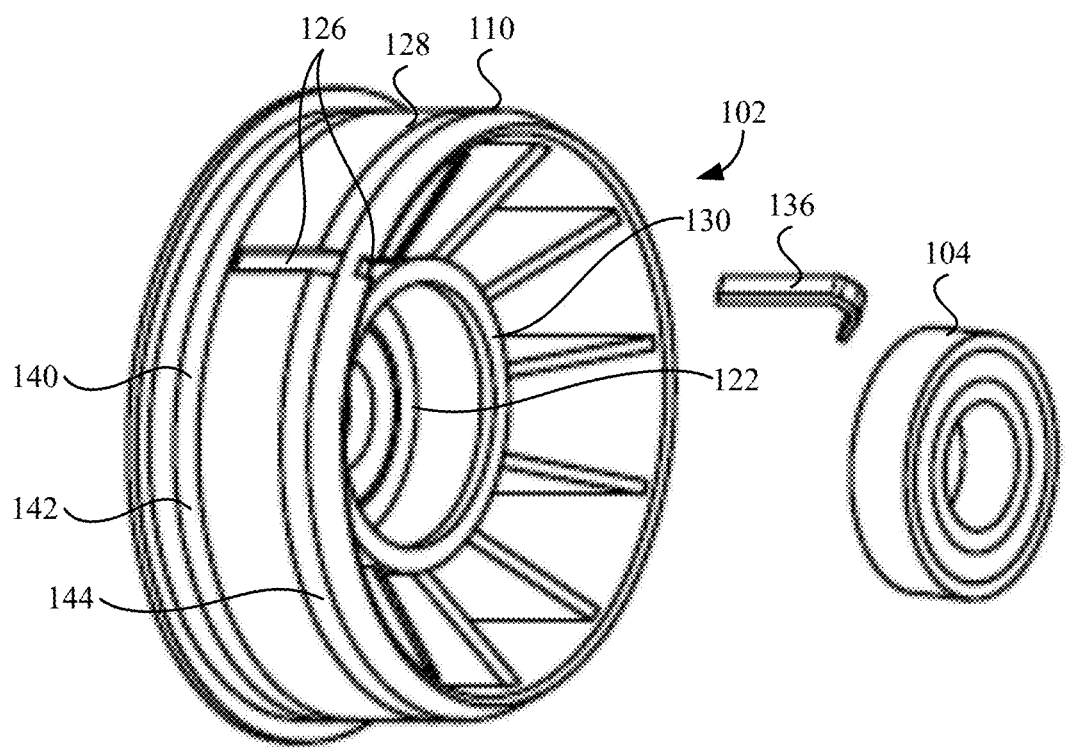
FIGS. 3A-C illustrate an end bell coupled to components for electrically grounding belt conveyor idler assembly.
Figures 3B, 3C:
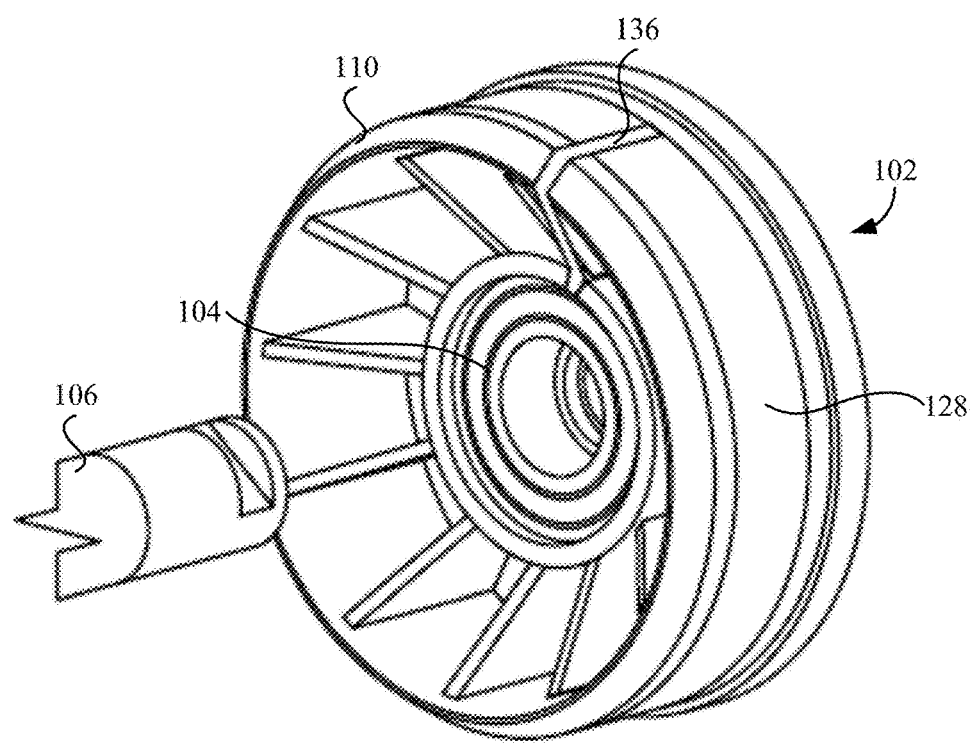

FIGS. 3A-C illustrate the end bell 102 coupled to components for electrically grounding a belt conveyor idler assembly 100. Because the end bell 102 is made of nonconductive material and an end bell 102 is located at each end of the belt conveyor idler assembly, when a tube roller of a belt conveyor idler assembly rotates, for example, to move the belt carrying material, static electricity is created. This static electricity needs to be grounded in order to avoid a static discharge and subsequent ignition and explosion of the material being carried on the belt.

In order to electrically ground the belt conveyor idler assembly, a grounding wire 136 is placed in the grounding groove 126 of the end bell 102. When the belt conveyor idler assembly is fully assembled, the grounding wire 136 is configured to electrically couple the tube roller 108 to the bearing or shaft. This is achieved by positioning one end of the grounding wire between the tube roller 108 and the outer portion 128 of the housing 110 of the end bell 102, then positioning the other end of the grounding wire 136 along an outer surface 130 of the bearing seat 112 of the housing 110. This electric coupling provides a dissipation path for static electricity created by the spinning/rolling of a belt over the tube roller 108 to be discharged.

To attach the end bell 102 to the tube roller 108, an adhesive 140 can be place around the outer portion 128 of the housing 110 of the end bell 102. This can be done in addition to using a press fit process. In some cases, the adhesive 140 includes a first strip 142 and a second strip 144 applied around the outer portion 128 of the housing 110 of the end bell 102. The adhesive 140 prevents the end bell 102 from being dislodged from the tube roller 108 and prevents unwanted movement of the end bell 102, keeping the grounding wire 136 in the grounding groove 126 and coupled to the tube roller 108.

Figure 4:
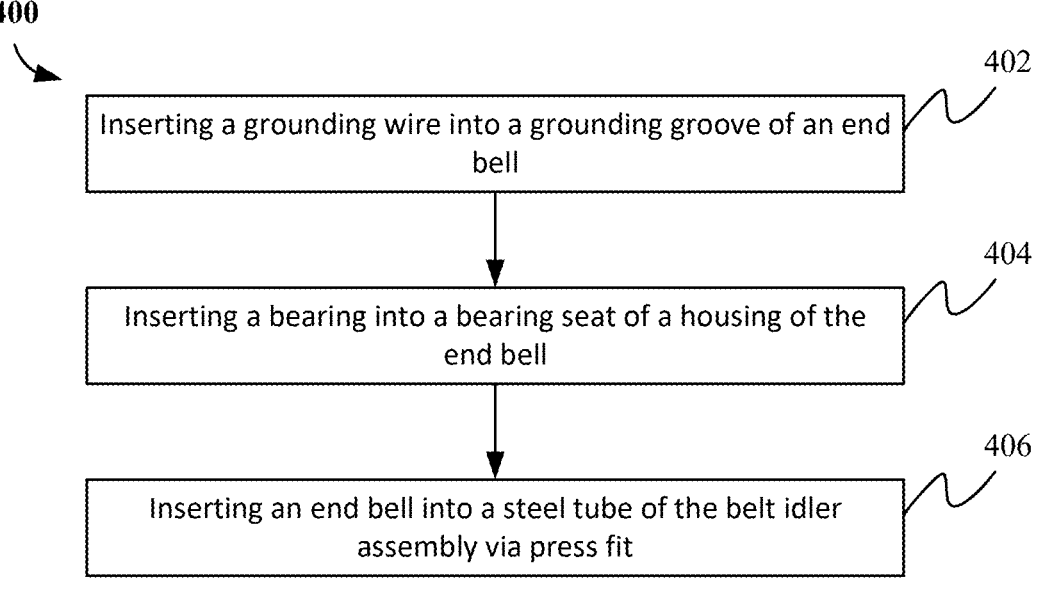
FIG. 4 illustrates a flow chart for a method of attaching an end bell to a belt conveyor idler assembly.

FIG. 4 illustrates a flow chart for a method of attaching an end bell in a belt conveyor idler assembly. Referring to FIG. 4, the method 400 of attaching an end bell to a belt conveyor idler assembly includes inserting 402 a grounding wire into a grounding groove of the end bell, inserting 404 a bearing into the bearing seat of a housing of the end bell, and inserting 406 the end bell into a tube roller of the belt conveyor idler assembly via press fit. Advantageously, the method 400 of attaching an end bell to a belt conveyor idler assembly reduces time of manufacturing and attaching the end bell and belt conveyor idler assembly versus conventional methods that include machining and welding the end bell to the belt conveyor idler assembly while also allowing a more durable, longer lasting nonconductive material to be used to make the end bell itself while also providing a path to dissipate static electricity that may otherwise pose an explosion risk. In this case, the tube roller should be configured to discharge the static electricity. For example, this can be achieved with a steel tube roller.

In some cases, the method 400 further includes electrically coupling a first end of the grounding wire to the tube roller of the belt conveyor idler assembly and electrically coupling a second end of the grounding wire to the bearing of the belt conveyor idler assembly. In some cases, the grounding wire is coupled to the tube roller and the bearing after the bearing is inserted 404 into the bearing seat of the housing of the end bell and before the end bell is inserted 406 into the tube roller of the belt conveyor idler assembly via press fit.

In some cases, the method 400 further includes applying an adhesive to an outer portion of the housing of the end bell. In some cases, the adhesive includes a first strip and a second strip applied around the outer portion of the housing of the end bell. In some cases, the adhesive is applied to the outer portion of the housing of the end bell prior to the end bell is inserted 406 into the tube roller of the belt conveyor idler assembly via press fit. In some cases, the method 400 further includes inserting a shaft through a shaft aperture of the end bell. In some cases, inserting 402 the grounding wire into the grounding groove of the end bell includes inserting a first end of the grounding wire into a first portion of the grounding groove positioned in the bearing seat of the housing of the end bell and inserting a second end of the grounding wire into a second portion of the grounding groove positioned in an outer portion of the housing of the end bell. For example, a first end of the grounding wire can be inserted 402 into a first portion of the grounding groove positioned in the bearing seat of the housing of the end bell, followed by insertion 404 of the bearing into the bearing seat of the end bell and the shaft through the shaft aperture of the end bell, followed by insertion of the second end of the grounding wire into a second portion of the grounding groove positioned in an outer portion of the housing of the end bell, followed by insertion of the end bell into the roller tube of the belt conveyor idler assembly via press fit. In some cases, the same steps are repeated for the corresponding end bell placed on the other end of the belt conveyor idler assembly.

Although the subject matter has been described in language specific to structural features and/or acts, it is to be understood that the subject matter defined in the appended claims is not necessarily limited to the specific features or acts described above. Rather, the specific features and acts described above are disclosed as examples of implementing the claims and other equivalent features and acts are intended to be within the scope of the claims.

What is claimed is:

1. An end bell for a belt conveyor idler assembly comprising:
   a housing comprising:
      a bearing seat for a bearing positioned within an inner portion of the housing; and
      a grounding groove for a grounding wire positioned along an outer portion of the housing.

2. The end bell of claim 1, wherein the end bell is made of a nonconductive material.

3. The end bell of claim 2, wherein the nonconductive material is at least one of nylon, high-density polyethylene, polyethylene terephthalate, fiber-reinforced plastic, glass-fiber-reinforced plastic, carbon-fiber-reinforced plastic, and glass-fiber-reinforced nylon.

4. The end bell of claim 1, wherein the outer portion of the housing has an outside diameter of 4.0 inches to 7.0 inches.

5. The end bell of claim 1, wherein a width of the outer portion of the housing is greater than a width of the bearing seat.

6. The end bell of claim 1, wherein an inner face of the bearing seat is proximal to a tube roller of the belt conveyor idler assembly.

7. The end bell of claim 1, wherein the bearing seat is configured to receive a 2RS ball bearing.

8. The end bell of claim 1, wherein the grounding groove is positioned along an outer edge of the bearing seat.

9. The end bell of claim 1, wherein the grounding groove is configured to receive a 14-gauge braided conductive wire.

10. The end bell of claim 1, further comprising gussets connecting an outer edge of the bearing seat to an inner surface of the outer portion of the housing.

11. The end bell of claim 10, wherein the gussets are evenly spaced around the bearing seat.

12. The end bell of claim 10, wherein the gussets include a gusset edge that runs from an inner edge of the outer portion of the housing to the outer edge of the bearing seat of the housing.

13. The end bell of claim 1, further comprising a shaft aperture for a belt conveyor idler shaft positioned proximal to a center of the housing.

14. The end bell of claim 1, further comprising a circular endpiece attached to an outer end of the housing and having a larger diameter than the outer portion of the housing.

15. A method of attaching an end bell to a belt conveyor idler assembly, comprising:
   inserting a grounding wire into a grounding groove of the end bell;
   inserting a bearing into a bearing seat of a housing of the end bell; and
   inserting the end bell into a tube roller of the belt conveyor idler assembly via press fit.

16. The method of claim 15, further comprising:
   electrically coupling a first end of the grounding wire to the tube roller of the belt conveyor idler assembly; and
   electrically coupling a second end of the grounding wire to the bearing or a shaft of the belt conveyor idler assembly.

17. The method of claim 15, further comprising applying an adhesive to an outer portion of the housing of the end bell.

18. The method of claim 15, wherein inserting the grounding wire into the grounding groove of the end bell comprises inserting a first end of the grounding wire into a first portion of the grounding groove positioned in the bearing seat of the housing of the end bell and inserting a second end of the grounding wire into a second portion of the grounding groove positioned in an outer portion of the housing of the end bell.

19. The method of claim 15, wherein the end bell is made of nonconductive material.

20. The method of claim 15, further comprising inserting a shaft through a shaft aperture of the end bell.

* * * * *